United States Patent [19]

Metzner et al.

[11] 3,720,635

[45] March 13, 1973

[54] POLYESTER MOULDING AND COATING MASSES WHICH CAN BE CURED BY ULTRAVIOLET IRRADIATION

[75] Inventors: Wolfgang Metzner; Karl Fuhr; Hans Rudolph; Hermann Schnell; Hans-Georg Heine, all of Krefeld-Uerdingen, Germany

[73] Assignee: Bayer Aktiengesellschaft, Leverkusen, Germany

[22] Filed: May 5, 1971

[21] Appl. No.: 140,581

[30] Foreign Application Priority Data

April 16, 1968 Germany............P 17 69 168.8

Related U.S. Application Data

[63] Continuation of Ser. No. 810,370, March 25, 1969, abandoned.

[52] U.S. Cl..........260/862, 260/28.5 R, 204/159.15, 204/159.24

[51] Int. Cl.........C08f 21/02, C08f 43/08, C08f 1/20
[58] Field of Search..............260/28.5 R, 862, 590; 204/159.15, 159.24

[56] References Cited

UNITED STATES PATENTS

| | | | |
|---|---|---|---|
| 2,722,512 | 11/1955 | Crandall | 204/159.23 |
| 3,386,904 | 6/1968 | Petropoulos | 204/159.24 |
| 3,429,795 | 2/1969 | Delzenne et al. | 204/159.15 |
| 3,450,612 | 6/1969 | Randolph et al. | 260/863 |
| 3,305,588 | 2/1967 | Schleppnik | 260/590 |

*Primary Examiner*—Morris Liebman
*Assistant Examiner*—S. L. Fox
*Attorney*—Connolly and Hutz

[57] ABSTRACT

Moulding and coating masses which can be cured by UV-irradiation and consist of mixtures of unsaturated polyesters and copolymerizable monomeric compounds with a content of phenylthio derivates of acetophenones as photosensitizers.

2 Claims, No Drawings

POLYESTER MOULDING AND COATING MASSES WHICH CAN BE CURED BY ULTRAVIOLET IRRADIATION

CROSS-REFERENCE TO RELATED APPLICATION

This application is a continuation of now abandoned application Ser. No. 810,370 filed Mar. 25, 1969.

When photosensitizers are applied to polymerizable substances, their effect is extremely substrate-specific, as is apparent from many publications.

The photosensitizers hitherto known for the photochemical polymerization of polyester moulding and coating masses belong to the following groups, viz. (1) 0-alkyl- xanthogenic acid esters which are activated in the β-position to the sulphur atom by a double bond (U.S. Pat. No. 2,716,633); (2) aromatic disulphides (German published Pat. specification No. 1,233,594); (3) certain halogen compounds (C.M. McCloskey, J. Bond, Ing. Engng. Chem. 47, 2125 [1955]); and (4) benzoin and derivatives of benzoin, viz. α-substituted benzoins (U.S. Pat. No. 2,722,512) and benzoin ethers of primary alcohols (French Pat. No. 1,450,589).

Some of the compounds belonging to these groups possess substantial disadvantages which have made their application in industry impossible or have at least impaired it.

Thus, the compounds mentioned under (1) are difficult to obtain and, like the compounds mentioned under (2), they do not satisfy the demands made on them in respect of reactivity. However, compounds belonging to the groups (1) and (2) yield colorless polymers which are not liable to discoloration. On the other hand, the compounds mentioned under (3) were unsatisfactory, due to their deficient reactivity and to strong discolorations of the cured mouldings. The compounds mentioned under (4) also yield polymers which are liable to a certain yellowing. Moreover, the correspondingly modified moulding masses are not stable when stored in the dark so that the production of stable single-component masses is not possible.

The object of the invention, then, comprises moulding and coating masses which can be cured by UV- irradiation comprising mixtures of unsaturated polyesters and copolymerizable monomeric compounds with a content of photosensitizers, wherein the photosensitizer is a compound of the formula

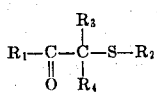

in which either $R_1$ and $R_2$ each stand for an aromatic radical, and $R_3$ and $R_4$ stand for aliphatic or araliphatic radicals or hydrogen atoms, or $R_1$ and $R_3$ each stand for an aromatic radical and $R_2$ and $R_4$ stand for aliphatic, araliphatic or aromatic radicals, and $R_4$ may also be a hydrogen atom.

Examples of such sensitizers are:

2-phenylthio, 2-p-methyl-phenylthio, 2-p-ethyl-phenylthio, 2-p-tert.-butyl-phenylthio, 2-p-chloro-phenylthio, 2-p-methoxy-phenylthio, 2-o-methyl-phenylthio, 2-o-chloro- phenylthio, 2-m-methyl-phenylthio, and 2-pentachloro-phenylthio derivatives of acetophenone, propiophenone, butyrophenone and i-butyrophenone; as well as 2-ethylthio, 2-isopropylthio, 2-n-butylthio, 2-n-dodecylthio, 2-phenylthio, 2-p-methyl-phenylthio, 2-p-ethyl-phenylthio, 2-p-tert.-butyl-phenylthio, 2-p-chloro-phenylthio, 2-p-methoxy-phenylthio, 2-o-methyl-phenylthio, 2-o-chlorophenylthio, 2-m-methyl-phenythio and 2-pentachloro-phenylthio derivatives of 2-phenyl-acetophenone, 2,2-diphenyl-acetophenone, 2-phenyl-propiophenone, 2-phenyl-butyrophenone and 2-naphthyl-acetonaphthone.

These compounds can be prepared in known manner by reacting α-halo-ketones, such as 2-chloro-acetophenone and 2-chloro-2-phenyl-acetophenone, with the sodium salts of the corresponding mercaptans or thiophenols (see e.g. Schönberg et al., J. Amer. Chem. Soc. 78, 1224 [1956]).

These photosensitizers impart an extraordinarily high reactivity of the moulding and coating masses in which they are dissolved. They are thus distinguished from the hitherto known sulphur-containing sensitizers. In particular, they also lead to a rapid curing under the ultraviolet radiation of low-energy fluorescent lamps with an emission above 300 mμ.

The new photosensitizers now characterized in that they do not give rise to discoloration during polymerization or during subsequent storage under the influence of light.

Furthermore, a number of the moulding and coating masses according to the invention have an excellent stability to dark storage. For example, a styrene solution of an unsaturated polyester, which contains 2 per cent by weight 2-phenylthio-propiophenone, 2-p-methyl-phenylthio-1-butyrophenone, 2-pentachloro-phenylthio-propiophenone, 2-pentachloro- phenylthio-2-phenyl-acetophenone or 2-pentachlorophenylthio-2-napthyl-acetonaphthone, has a virtually unlimited stability at room temperature and is eminently suitable, for example, to serve as a stable single-component system.

The moulding and coating masses expediently contain the photosensitizers described above in amounts of about 0.1 to about 5 per cent by weight, preferably about 0.5 to about 2.5 per cent by weight, either by themselves or in mixture with one another.

As radiation sources for carrying out the photopolymerization there may be used natural sun light or artificial radiators the emission of which lies in the range from 250–500 mμ, preferably 300 – 400 mμ. Advantageous sources are mercury vapor, xenone and tungsten lamps, particularly special fluorescent lamps with emissions above 300 mμ.

In the following Table 1, the paraffin floating times of solutions of a typical photopolymerized unsaturated polyester of maleic acid, phthalic acid and propyleneglycol-1,2 in styrene are compared, as they are obtained with the use of known photosensitizers, on the one hand, and with photosensitizers according to the invention, on the other hand. In each case, the sensitizers have been added in amounts of 1 millimol to the mixture of 10 g of a supply form containing 65 per cent by weight of solids with 2 g styrene and 0.1 g of a 10 per cent by weight solution of paraffin (m.p. 52° – 53°C) in toluene. The layers of 500 μ thickness are exposed to the radiation of a fluorescent lamp (Osram L-lamp for tracing purposes, 40 watt, length 97 cm) at a distance of 5 cm.

TABLE 1

Paraffin floating times (after minutes) of a typical polyester resin which has been admixed with 1 millimol of various photosensitizers per 10 g of supply form, 2 g styrene and 0.1 ml of paraffin solution.

| Photosensitizer | Test portion (1 millimol) as mg | Floating times of paraffin after minutes | |
|---|---|---|---|
| 4,4'-dimethyl-diphenyl-disulphide | 246 | 2.3 | |
| bis-(isopropyloxy-thioformyl)-disulphide | 270 | 3.0 | control tests |
| benzoin | 212 | 3.2 | |
| benzoin ethyl ether | 240 | 0.8 | |
| 2-phenylthio-acetophenone | 228 | 1.3 | |
| 2-n-butylthio-2-phenyl-acetophenone | 284 | 1.5 | |
| 2-phenylthio-2-phenyl-acetophenone | 304 | 0.8 | |
| 2-(4-methyl-phenylthio)-2-phenyl-acetophenone | 360 | 0.8 | |
| 2-(4-tert.-butyl-phenylthio)-2-phenyl-acetophenone | 318 | 0.9 | |

The coatings obtained after 30 minutes' irradiation are colorless, with the exception of those containing benzoin and benzoin ethyl ester; these exhibit a slight yellow discoloration.

The unsaturated polyesters comprise the usual polycondensation products obtained from $\alpha,\beta$-unsaturated dicarboxylic acids, optionally in mixture with saturated dicarboxylic acids, and polyols.

Copolymerizable monomeric compounds are unsaturated compounds the C—C double bonds of which are activated by halogen atoms or by carbonyl, cyanide, carboxyl, ester, amide, ether, aryl groups, or by carbon double and carbon triple bonds, preferably styrene and also, for example, $\alpha$-methyl-styrene, vinyl-toluene, acrylic and methacrylic acid esters and the corresponding amides.

The additives conventionally used in polyester chemistry may be present in the production of the moulding and coating masses.

The moulding and coating masses are, as usual, stabilized by the addition of conventional inhibitors, for example, p-benzoquinone, hydroquinone, 3-methyl-pyrocatechol or copper compounds, e.g. copper naphthenate, in the known quantities.

Polymerization catalysts, for example, peroxides, may be added in amounts of about 0.1 to about 4 per cent by weight. Suitable peroxides are, for example, tert.-butyl perbenzoate, dicumyl peroxide, benzoyl peroxide, lauroyl peroxide, and primarily methyl ethyl ketone peroxide and cyclohexanone peroxide. The addition of peroxides leads to an improved adhesion of the cured coatings to the substrate.

In combination with the use of ketone peroxides, metal compounds, such as cobalt, zirconium, and vanadium naphthenate, or metal chelates, e.g. cobalt- and zirconium-acetyl acetonate, may be added to accelerate the curing. However, the simultaneous presence of peroxides and metal accelerators reduces the storage stability of the masses. It is therefore recommended to work in such a case according to the active primer method, where the coating mass is applied to a peroxide-containing layer previously applied to the substrate.

It is particularly advantageous to use the photosensitizers according to the invention for those coating masses to which paraffin or wax or wax-like substances have been added, which float at the start of the polymerization and prevent the inhibiting of the atmospheric oxygen.

For the protection of substrates which are sensitive to light, for example, light-colored woods, small amounts of conventional UV-absorbers may be added to the moulding and coating masses without substantially impairing the reactivity.

Furthermore, small amounts of usual carriers and fillers as well as thixotropy agents, for example, glass fibers, synthetic fibers, silicic acid and talc, may be present in the moulding and coating masses during photopolymerization.

EXAMPLE 1

An unsaturated polyester prepared by condensation of 152 parts by weight maleic acid anhydride, 141 parts by weight phthalic acid anhydride and 195 parts by weight propane-diol-1,2 is mixed with 0.045 parts by weight hydroquinone and dissolved in styrene to give a 65 per cent by weight solution. Portions of 100 parts by weight of the resultant resin supply form are admixed with 20 parts by weight styrene, 1 part by weight of a 10 per cent by weight solution of paraffin (m.p. 52° – 53°C) in toluene and various sensitizers. The solution so obtained is applied by means of a film drawer (500 $\mu$) to glass plates and illuminated with the radiation of a fluorescent lamp (Osram L-lamp for tracing purposes, 40 watt, length 95 cm) at a distance of 5 cm. The paraffin floating times and the times required for achieving a pencil hardness >6 H are set out in Table 2.

TABLE 2

| Additive, referred to resin supply form % by weight | m.p. °C | Floating time of paraffin after min. | Pencil hardness >6 H after min. |
|---|---|---|---|
| 2 2-phenylthio-acetophenone | 54 | 1.4 | 14 |
| 2 2-phenylthio-2-phenyl-acetophenone | 79–81 | 0.9 | 13 |
| 2 2-(4-methyl-phenylthio-2-phenyl-acetophenone | 93–95 | 0.9 | 14 |
| 2 2-(4-tert.-butyl-phenylthio)-2-phenyl-acetophenone | 133–135 | 0.9 | 12 |
| 2 2-(4-chloro-phenylthio)-2-phenyl-acetophenone | 116–118 | 1.1 | 12 |
| 2 2-pentachloro-phenylthio-2-phenyl-acetophenone | 181–182 | 1.0 | 14 |
| 2 2-n-butylthio-2-phenyl-acetophenone | 63 | 1.6 | 17 |
| 2 2-n-dodecylthio-2-phenyl-acetophenone | 59–60 | 1.7 | 17 |

| Additive, referred to resin supply form % by weight | | Floating time of paraffin after min | Pencil hardness >6 H after min |
|---|---|---|---|
| 2 | 2-phenylthio-propiophenone ($n_D^{20}$ 1.6131) | 1.0 | 11 |
| 2 | 2-pentachlorophenylthio propiophenone 171–172 | 0.8 | 8.5 |
| 2 | 2-p-methyl-phenylthiobytyro-phenone ($n_D^{20}$ 1.5969) | 1.3 | 14 |
| 2 | 2-phenylthio-2-p-methylphenyl-p-methylacetophenone 52 | 1.0 | 13 |
| 2 | 2-phenylthio-2-phenyl-p-chloro-acetophenone 70 | 1.0 | 11 |
| 2 | 2-phenylthio-2-naphthyl-acetonaphthone 115–118 | 1.5 | 17 |
| 2 | 2-pentachlorophenylthio-2-naphthyl-acetonaphthone 180–184 | 1.2 | 14 |

EXAMPLE 2

One-hundred Parts by weight of the resin supply form described in Example 1, 20 parts by weight styrene and 1 part by weight of a 10 per cent by weight solution of paraffin (m.p. 52° – 53°C) in toluene are mixed with various sensitizers and, in addition, with various peroxides, metal-containing compounds and UV-absorbers. Layers of 500 μ thickness of these solutions are applied by means of a film drawer to glass plates and exposed at a distance of 5 cm to the radiation of the fluorescent lamp described above. The paraffin floating times and the times required for achieving a pencil hardness >6 H are set out Table 3.

TABLE 3

| | | Additive, referred to resin supply form % by weight | Floating time of paraffin as min. | Pencil hardness >6 H after min |
|---|---|---|---|---|
| 1. | 2 | 2-phenylthio-acetophenone | | |
| | 4 | cyclohexanone-peroxide (50% in plasticizer) | 1.4 | 19 |
| 2. | 2 | 2-phenylthio-2-phenyl-acetophenone | | |
| | 4 | methyl ethyl ketone peroxide (40% in plasticizer) | 1.1 | 20 |
| 3. | 2 | 2-phenylthio-2-phenyl-acetophenone | 1.2 | 17 |
| | 2 | cobalt napthenate solution (20% in toluene) | | |
| 4. | 2 | 2-phenylthio-2-phenyl-acetophenone | | |
| | 2 | cobalt naphthenate solution (20% in toluene) | 3.3 | 32 |
| | 4 | methyl ethyl ketone peroxide (40% in plasticizer) | | |
| 5. | 2 | 2-phenylthio-2-phenyl-acetophenone | | |
| | 4 | methyl ethyl ketone peroxide (40% in plasticizer) | 2.3 | 31 |
| | 0.25 | 2-hydroxy-4-methoxy-benzophenone | | |
| 6. | 2 | 2-n-butylthio-2-phenyl-aceto-phenone | | |
| | 4 | methyl ethyl ketone peroxide (40% in plasticizer) | 2.1 | 32 |
| 7. | 2 | 2-(2-methylphenylthio)-2-phenyl-acetophenone | | |
| | 0.05 | α-cyano-β-(4-methoxyphenyl)-methacrylic acid butyl ester | 3.0 | 29 |
| 8. | 2 | 2-(4-chlorophenylthio)-2-phenyl-acetophenone | | |
| | 2 | cobalt naphthenate solution (20% in toluene) | | |
| | 2 | methyl ethyl ketone peroxide (40% in plasticizer) | 4.0 | 31 |
| | 2 | cumol hydroperoxide (70%) | | |

EXAMPLE 3

An active primer consisting of 50 g of a nitrocellulose solution (20 per cent by weight in ethyl acetate), 18 g butyl acetate, 20 g methyl ethyl ketone peroxide (40 per cent by weight in a plasticizer) and ethyl acetate to make up to a volume of 100 ml is applied to wood in a layer of 100 μ thickness. When the solvents have evaporated, there is applied a layer of 500 μ thickness of a polyester resin mixture consisting of 100 parts by weight of a resin supply form as described in Example 1, 20 parts by weight styrene, 1 part by weight of a 10 per cent by weight solution of paraffin (m.p. 52° – 53°C) in toluene, 2 parts by weight 2-pentachlorophenylthio-2-phenyl-acetophenone as well as of a cobalt naphthenate solution and an UV-absorber as further additives, and after 3 minutes' de-aeration this layer is irradiated, with the fluorescent lamp described above at a distance of 5 cm. The description of the additives and the results of the polymerization are contained in Table 4.

TABLE 4

| Additives, referred to resin supply form % by weight | Floating time of paraffin after min | Pencil hardness >6 H after min |
|---|---|---|
| without additive | 1.6 | 18 |
| 2 cobalt naphthenate solution (20% in toluene) | 2.0 | 22 |
| 2 cobalt naphthenate solution (20% in toluene) <br> 0.1 α-cyano-β-(4-methoxyphenyl)-methacrylic acid butyl ester | 4.5 | 29 |

EXAMPLE 4

An unsaturated polyester obtained by condensation of 1,765 parts by weight maleic acid anhydride, 756 parts by weight ethylene glycol, 405 parts by weight butanediol-1,3 and 1,540 parts by weight trimethylolpropane diallyl ether in the presence of 0.83 parts by weight hydroquinone is dissolved in styrene to give a 70 per cent by weight solution. 100 Parts by weight of the resultant resin supply form and 1 part by weight of a 1 per cent by weight cobalt naphthenate solution (20 per cent by weight in toluene) are mixed with various sensitizers. The solution is applied in a layer of 500 μ thickness to glass and illuminated at a distance of 5 cm with the fluorescent lamp described above until the film has gelled. The prepolymer is then illuminated by the radiation of a high pressure mercury burner (Philips HPK 125W/L) at a distance of 10 cm until the surface of the coating is tack-free. The pencil hardness then amounts to >6 H.

The times required for gelling under the fluorescent lamp and for curing are contained in Table 5.

TABLE 5

| Additive, referred to resin supply form % by weight | Gelling under fluorescent lamp after min. | Curing under Hg high pressure burner after min. pencil hardness >6 H |
|---|---|---|
| 2 2-(p-methylphenylthio)-2,2-dimethyl-acetophenone | 1.3 | 13 |
| 2 2-n-butylthio-2-phenyl-acetophenone | 1.2 | 11 |
| 2 2-phenylthio-2-phenyl- | | |

| acetophenone | 0.8 | 12 |

We claim:

1. A moulding and coating mass which can be cured by UV irradiation comprising a mixture of an unsaturated polyester, a monomeric compound selected from the group consisting of styrene, α-methylstyrene, vinyl toluene, acrylic acid ester, methacrylic acid ester, acrylic acid amide and methacrylic acid amide and a photosensitizing amount of a compound of the formula

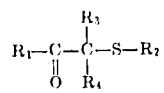

wherein $R_1$ and $R_2$ are each an aromatic radical and $R_3$ and $R_4$ are each hydrogen or alkyl having from one to two carbon atoms.

2. The moulding and coating mass of claim 1 wherein the compound of said formula is selected from the group consisting of 2-phenylthio-acetophenone, 2-phenylthio-propiophenone, 2-pentachlorophenylthio-propiophenone, 2-p-methylphenylthio-butyrophenone and 2-p-methylphenylthio-2,2-dimethyl-acetophenone.

* * * * *